United States Patent
Tsai et al.

(10) Patent No.: US 12,316,389 B1
(45) Date of Patent: May 27, 2025

(54) MITIGATION OF MICROWAVE INTERFERENCE

(71) Applicant: Amazon Technologies, Inc., Seattle, WA (US)

(72) Inventors: Kun Ting Tsai, Fremont, CA (US); Sudheep Thota, San Jose, CA (US); Chirag Bhavsar, Santa Clara, CA (US); Pratik Kalpesh Patel, San Jose, CA (US); Rongsheng Huang, San Jose, CA (US); Jungtao Liu, Saratoga, CA (US); Songping Wu, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1594 days.

(21) Appl. No.: 16/212,123

(22) Filed: Dec. 6, 2018

Related U.S. Application Data

(60) Provisional application No. 62/613,904, filed on Jan. 5, 2018.

(51) Int. Cl.
*H04B 15/02* (2006.01)
*G06F 3/16* (2006.01)
*H05B 6/66* (2006.01)

(52) U.S. Cl.
CPC ............ *H04B 15/02* (2013.01); *G06F 3/167* (2013.01); *H05B 6/668* (2013.01)

(58) Field of Classification Search
CPC .......... H04B 15/02; G06F 3/167; H05B 6/668
USPC .................................... 219/714; 370/332, 338
See application file for complete search history.

(56) References Cited

U.S. PATENT DOCUMENTS

| | | | | |
|---|---|---|---|---|
| 8,050,627 | B2 * | 11/2011 | Makhlouf | H04W 74/0808 455/63.1 |
| 2008/0198811 | A1 * | 8/2008 | Deshpande | H04W 48/16 370/332 |
| 2013/0008893 | A1 * | 1/2013 | Little | H05B 6/681 219/702 |
| 2014/0112229 | A1 * | 4/2014 | Merlin | H04L 5/0055 370/311 |

\* cited by examiner

*Primary Examiner* — Steven W Crabb
*Assistant Examiner* — Thomas J Ward
(74) *Attorney, Agent, or Firm* — Eversheds Sutherland (US) LLP

(57) ABSTRACT

Systems, methods, and computer-readable media are disclosed for mitigating microwave interference in electronic devices. Example devices may include memory and at least one processor configured to access the memory and execute computer-executable instructions to determine that a microwave source is inactive, transmit a second message to the access point requesting the access point to send the data, receive, from the access point, the data buffered during the first duration, and transmit a third message to the access point, the third message cancelling the buffer request of the first message.

14 Claims, 8 Drawing Sheets

MITIGATION OF MICROWAVE INTERFERENCE

CROSS-REFERENCE TO RELATED APPLICATION

This application claims the benefit of U.S. Provisional Application No. 62/613,904, filed Jan. 5, 2018, which is incorporated by reference in its entirety.

BACKGROUND

Certain appliances, such as microwave ovens, may cause radio interference that disrupts wireless communication. For example, an error rate for wireless communication may be negatively impacted by radio interference output from a microwave oven when the microwave oven is in use. As a result, data transmissions may need to be repeated and/or may be corrupted. Other appliances or devices may also output electromagnetic interference that negatively impacts wireless communication. Accordingly, mitigation of microwave and other interference may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
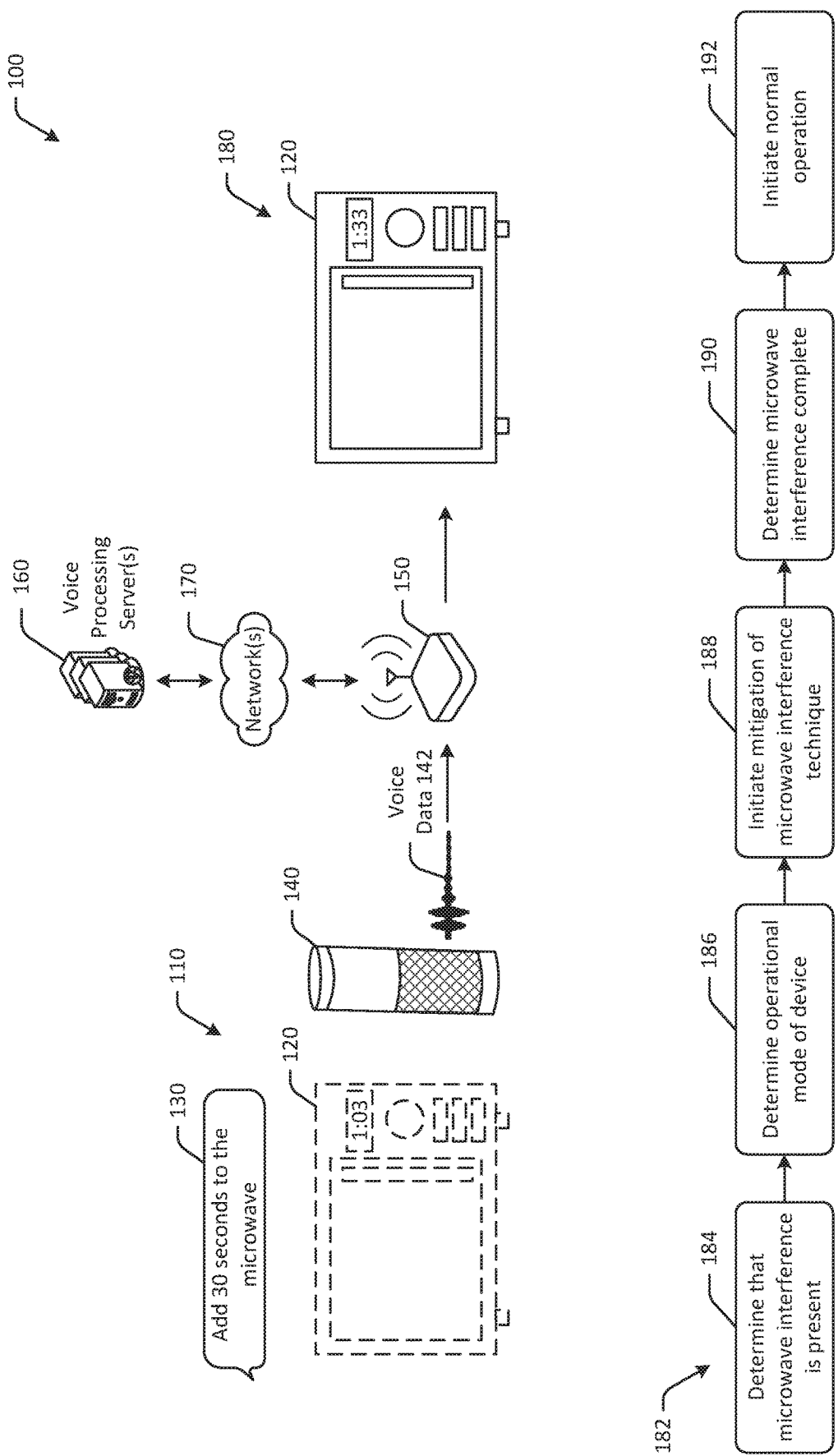
FIG. 1 is a schematic illustration of an example use case for mitigating microwave interference for a microwave oven in accordance with one or more example embodiments of the disclosure.

Performance of electronic devices may be impacted by radio interference, such as electromagnetic interference caused by microwave ovens. For example, while in operation, magnetrons of microwave ovens may emit energy that negatively impacts wireless communication. As a result, error rates associated with wireless communication of electronic devices physically nearby the microwave oven may increase, and/or throughput of data may decrease. In such instances, data transmission may be difficult.

A microwave oven may reside within an environment (e.g., in a home, office, hotel, etc.), perhaps along with one or more additional wireless communication devices (including, for example, one or more speech interface devices, home automation devices, mobile phones, tablets, TVs, wireless speakers, etc.). The microwave oven itself may be a wireless communication device that is equipped with a wireless radio or transceiver to transmit and receive data wirelessly. In this scenario, the microwave oven can implement the microwave interference mitigation techniques described herein. Additionally, or alternatively, the microwave interference mitigation techniques described herein can be implemented by a non-microwave wireless communication device (e.g., a speech interface device, etc.) or different device that is in wired or wireless communication with a microwave oven.

A user can operate a microwave oven by starting and stopping the microwave oven. In some instances, a user can operate a microwave oven using voice commands. For example, a user may utter "Alexa, turn on the microwave for 2 minutes," which may cause the microwave to start a cook timer of two minutes. When the microwave oven is in operation, a magnetron operates by generating microwave energy that heats food within the microwave oven. When the microwave oven is not in operation (and hence, the magnetron is not operating), a wireless communication device(s) (e.g., the microwave oven itself, a speech interface device, a mobile phone, etc.) in the environment may transmit data wirelessly without any impact on the performance of the wireless data transmission from the microwave oven. However, whenever the microwave oven is in operation, the energy emission generated by the magnetron of the microwave oven creates electromagnetic interference, which may disrupt radio communication in the environment of the microwave oven. Accordingly, mitigation of microwave interference may reduce a likelihood of downgraded performance of wireless communication for electronic devices.

An example of a particular issue caused by microwave energy radio interference is low rate selection. In particular, downlink traffic from an access point to an electronic device at or near an active microwave oven may fail due to microwave pulses when the magnetron of the microwave is operational. In some instances, the lowest data transmission rate that can be selected is 1 megabit-per-second (Mbps). At 1 Mbps, a data packet with a size of 1500 bytes packet may need more than 12 milliseconds to transmit, which may be more time than is available when a microwave is in operation. For example, the magnetron of the microwave may move between stages of a duty cycle, such as an on-and-off cycle or active-and-inactive cycle, during which no microwave energy is emitted during the inactive portion or off portion of the duty cycle. However, the inactive portion of the cycle may not be 12 milliseconds long. Accordingly, at 1 Mbps, a data packet with a size of 1500 bytes may not be successfully transmitted in some instances. Moreover, transmission failure may cause a wireless connection (e.g., Transmission Control Protocol connection, etc.) to be lost as a result of certain rate adaptation algorithms, thereby resulting in a failure of internet service. For example, due to consecutive and/or multiple failed transmissions, certain access points may select lower or reduced transmission rates to increase the probability of reception. However, lower transmission rates may not increase a probability of reception in instances where a microwave is in use, but instead cause longer transmission times, which may increase a likelihood of corruption due to microwave interference. Longer transmission times can prevent transmissions and/or cause a connection to drop. Accordingly, microwave interference, or other forms of radio interference, may cause wireless connections to drop and/or low throughput, with a root cause of repeated transmission failures due to low rate selection and corresponding long transmission durations. In some instances, rate adaptation selection may be performed by an access point using one or more algorithms, and as a result, client devices may be unable to influence rate adaptation selections made by access points.

Embodiments of the disclosure include systems and methods for mitigating microwave interference in electronic devices. Certain embodiments may determine whether radio interference, such as microwave interference, is present, and based at least in part on the presence of, or expected presence of, radio interference, may implement one or more mitigation techniques to reduce error rates, data loss, and/or corruption of data. Certain embodiments may increase throughput by implementing one or more mitigation techniques, such as one or more power save mode management techniques. In some embodiments, a certain sequence of mitigation techniques may be deployed or implemented, while in other embodiments, particular mitigation techniques may be selected for implementation. For example, certain techniques may be selected in certain environments and/or based on certain types of access points, while other techniques may be selected in different environments and/or based on connections to different types of access points. Some embodiments may implement one or more mitigation techniques, so as to mitigate or reduce negative effects of microwave interference.

This disclosure relates to, among other things, devices, systems, methods, computer-readable media, techniques, and methodologies for mitigating microwave interference in electronic devices. Certain embodiments mitigate microwave interference while maintaining an ability to perform wireless communication at a consistent level and/or throughput. Some embodiments may implement one or more software or hardware changes for mitigation techniques that can allow electronic devices to maintain wireless connections in the physical presence of microwave interference. In some instances, embodiments of the disclosure may implement one or more changes to operations performed at, or using, WiFi chip systems of an electronic device. As a result, devices may be able to continue performing uninterrupted, while in the presence of an active microwave oven.

Referring to FIG. 1, an example use case 100 for mitigating microwave interference for a microwave oven in accordance with one or more example embodiments of the disclosure. In FIG. 1, at a first instance 110, a microwave oven 120, a voice interaction device 140, and an access point 150 may be in an environment. The microwave oven 120 and the voice interaction device 140 may be wirelessly connected to the access point 150 over, for example, a WiFi connection. Other communication protocols may be used. In some embodiments, the microwave oven 120 and the voice interaction device 140 may be integrated into a single microwave oven device that includes one or more microphones and is configured to determine voice commands and so forth.

The microwave oven 120 may be configured to generate heat. For example, a user may place food in the microwave oven 120 to increase a temperature of the food. The voice interaction device 140 may be configured to receive and/or determine voice inputs and to provide audible feedback. For example, a user may interact with the voice interaction device 140 via voice and/or physical contact. The voice interaction device 140 may include or may utilize a speech interface device or other audio device, such as one or more speakers, that are capable of playing or presenting various types of audio responsive to voice input. The voice interaction device 140 may operate in conjunction with and/or under the control of a remote network-based speech command service (e.g., voice processing server(s) 160, etc.) that is configured to receive audio, to recognize speech in the audio, and to perform functions or services in response to the recognized speech, or to generate audible dialog or audible content in response to recognized speech.

In the example of FIG. 1, a user in the environment may audibly utter a phrase or utterance 130, such as "add 30 seconds to the microwave." The utterance 130 may be an audible word or phrase intended by the user as a voice command. The utterance 130 may be detected by one or more microphones at the voice interaction device 140. The voice interaction device 140 may determine a meaning of utterances spoken by the user, and may cause one or more actions to be automatically executed and/or optionally generate audible content, such as comments, inquiries, and other responses, in response to user utterances. In some instances, the voice interaction device 140 may listen or monitor using one or more microphones for a wake word before capturing audio corresponding to a voice input from a user. For example, the wake word for the voice interaction device 140 may be "Alexa." As a result, the utterance 130 may be "Alexa, add 30 seconds to the microwave." Other embodiments may not include wake words. Accordingly, in on example, the voice interaction device 140 (or the microwave oven 120 in some instances) may detect a user utterance in an ambient environment of the microwave oven 120, and may determine that the user utterance is a wake word. Detection of the wake word may cause the voice interaction device 140 (or the microwave oven 120) to monitor for voice input. The voice interaction device 140 (or the microwave oven 120) may receive first voice input as the utterance 130.

The voice interaction 140 may detect the utterance 130 as analog sound input using one or more microphones and may generate corresponding digital voice data 142 representative of the analog sound input. The voice interaction device 140 may communicate with one or more voice processing servers 160 to determine a meaning of the utterance 130. For example, the voice interaction device 140 may send the voice data 142 to the one or more voice processing server(s) 160 over one or more wired or wireless communication networks 170 to determine a meaning of the sound input, or voice data 142. In some embodiments, the voice interaction device 140 may perform voice processing on the voice data 142 locally.

The voice processing server(s) 160 may process the voice data 142 to determine a meaning of the corresponding utterance 130. For example, the voice processing server(s) 160 may determine that the user intended to implement a command that increases a remaining cook time of the microwave oven 120 by 30 seconds. The voice processing server(s) 160 may therefore send a signal, such as a command signal or a directive, to the microwave oven 120 (and/or the voice interaction device 140) via the access point 150. The access point 150 may receive the data from the voice processing server(s) 160 and may send the data to the microwave oven 120. The microwave oven 120 may receive the data from the access point 150 and execute a command to increase the remaining cook time at the microwave oven. For example, at a second instance 180, the remaining cook time on the microwave oven 120 may increase from 1 minute 3 seconds at the first instance 110 to 1 minute 33 seconds at the second instance 180.

However, because the data indicative of the command to increase the remaining cook time was determined while the microwave oven 120 was in operation, the data transmission may be at risk of corruption due to microwave interference generated by a magnetron of the microwave oven 120.

To mitigate microwave interference for wireless communication, an example process flow 182 is presented and may be performed, for example, by the microwave oven 120, the voice interaction device 140, and/or another device in the environment. In the illustrated embodiment, the voice interaction device 140 may include at least one memory that stores computer-executable instructions and at least one processor configured to access the at least one memory and execute the computer-executable instructions to perform various actions or operations, such as one or more of the operations in the process flow 182 of FIG. 1.

At a first block 184, the voice interaction device 140 and/or the microwave oven 120 may determine that microwave interference is present. For example, as discussed with respect to FIG. 3, the microwave oven 120 may include a magnetron that generates microwave energy. The magnetron may have a duty cycle that includes active and inactive periods. The active and inactive periods may have the same, or substantially the same, or different durations. To determine whether microwave interference is present, the voice interaction device 140 may, for example, be coupled to the microwave oven 120 (e.g., via one or more general purpose input/output connections, etc.) that can be used to determine whether the magnetron is in an active portion of the duty cycle, and that therefore microwave interference is present (e.g., because the magnetron emits microwave radiation during the active portion, etc.), or the voice interaction device may implement a pattern matching algorithm to detect energy waveforms that can be compared to a repository of microwave energy waveform patterns, as discussed with respect to FIG. 3. Other methods to determine whether the magnetron is active may be used.

At block 186, the voice interaction device 140 and/or microwave oven 120 may determine an operational mode of the device. The operational mode may be indicative of one or more mitigation techniques and/or an order of mitigation techniques that are to be implemented when the microwave is in operation. The operational mode may be determined using a value. The operational mode may be set during setup and/or installation of the microwave oven 120 and may change depending on the ambient environment, the access point 150 configuration, make, model, and so forth, and/or other factors.

For example, a first operational mode may indicate that an unscheduled automatic power save delivery (uAPSD) mitigation technique is to be implemented. A second operational mode may indicate that a PS-poll mitigation technique is to be implemented, a third operational mode may indicate that a Null frame technique is to be implemented, and so forth. Various mitigation techniques are discussed, for example, with respect to FIGS. 2-7.

At block 188, the voice interaction device 140 and/or the microwave oven 120 may initiate the mitigation of microwave interference technique that corresponds to the operational mode. In the example of FIG. 1, the operational mode may indicate that a uAPSD mitigation technique is to be implemented. The uAPSD mitigation technique may include using a uAPSD mechanism to cause wireless communication during instances where the magnetron is in the inactive portion of the duty cycle, so that the risk of corruption due to microwave energy is reduced or removed. To implement the uAPSD mitigation technique, the microwave oven 120 may determine that a uAPSD mode is enabled at the access point 150. The microwave oven 120 may send a first add traffic stream request to the access point 150. The first add traffic stream request may be a Quality of Service action frame and may include an interval field value substantially equal to a duration of the inactive portion of the duty cycle of the microwave oven 120, an APSD field value equal to 1, and a power management field value equal to 1. In some instances, such as where the voice interaction device 140 and/or the microwave oven 120 is attempting to transmit data during the active portion (e.g., transmit the voice data 142, etc.), the voice interaction device 140 and/or the microwave oven 120 may store the data in local memory while the magnetron is in the active portion, and may transmit when the magnetron is in the inactive portion.

The access point 150 may receive the first add traffic stream request and may determine whether to approve the request. The access point 150 may send a message indicating that the add traffic stream request is approved to the microwave oven 120. The microwave oven 120 may receive an added traffic stream response from the access point 150 indicating that the first add traffic stream request is approved. Approval of the first add traffic stream request may cause the access point 150 to buffer data intended for the microwave oven 120 at least for the duration of the active portion of the microwave oven 120. The microwave oven 120 may determine that the active portion of the active-and-inactive cycle is complete and/or that the magnetron is in the inactive portion of the duty cycle. The microwave oven 120 may send a trigger frame to the access point 150. The trigger frame may cause the access point 150 to send buffered data to the microwave oven 120 for the duration indicated in the add traffic stream request. The microwave oven 120 may therefore receive data from the access point 150 for the duration. The data may include multiple, or a plurality of, frames responsive to the trigger frame. In some instances, the trigger frame may be a single frame. In the example of FIG. 1, the data may indicate that a cook time of the microwave oven 120 is to be increased by 30 seconds. The microwave oven 120 may therefore cause the cook time of the microwave oven 120 to be increased by 30 seconds.

At block 190, the voice interaction device 140 and/or microwave oven 120 may determine that microwave interference is complete. For example, the voice interaction device 140 and/or the microwave oven 120 may determine that the cook time has elapsed and/or that the microwave oven 120 is no longer in operation.

At block 192, the voice interaction device 140 and/or the microwave oven 120 may initiate normal operation. For example, the voice interaction device 140 and/or the microwave oven 120 may send a first delete traffic stream request to the access point 150 that causes the access point 150 to resume normal communication, such as by canceling buffering of data for the microwave oven 120. The deleted traffic stream request may be a Quality of Service action frame. As a result, wireless communication while the microwave oven is in operation may continue, and microwave interference may be mitigated.

Example embodiments of the disclosure provide a number of technical features or technical effects. For example, in accordance with example embodiments of the disclosure, certain embodiments of the disclosure may automatically implement one or more mitigation techniques, determine microwave interference presence, determine performance of various mitigation techniques, and/or maintain device throughput while radio interference is present. As a result of improved functionality, throughput and/or wireless connections may be maintained while mitigating microwave interference. Embodiments of the disclosure may improve computing efficiency and bandwidth by reducing error rates and data corruption. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
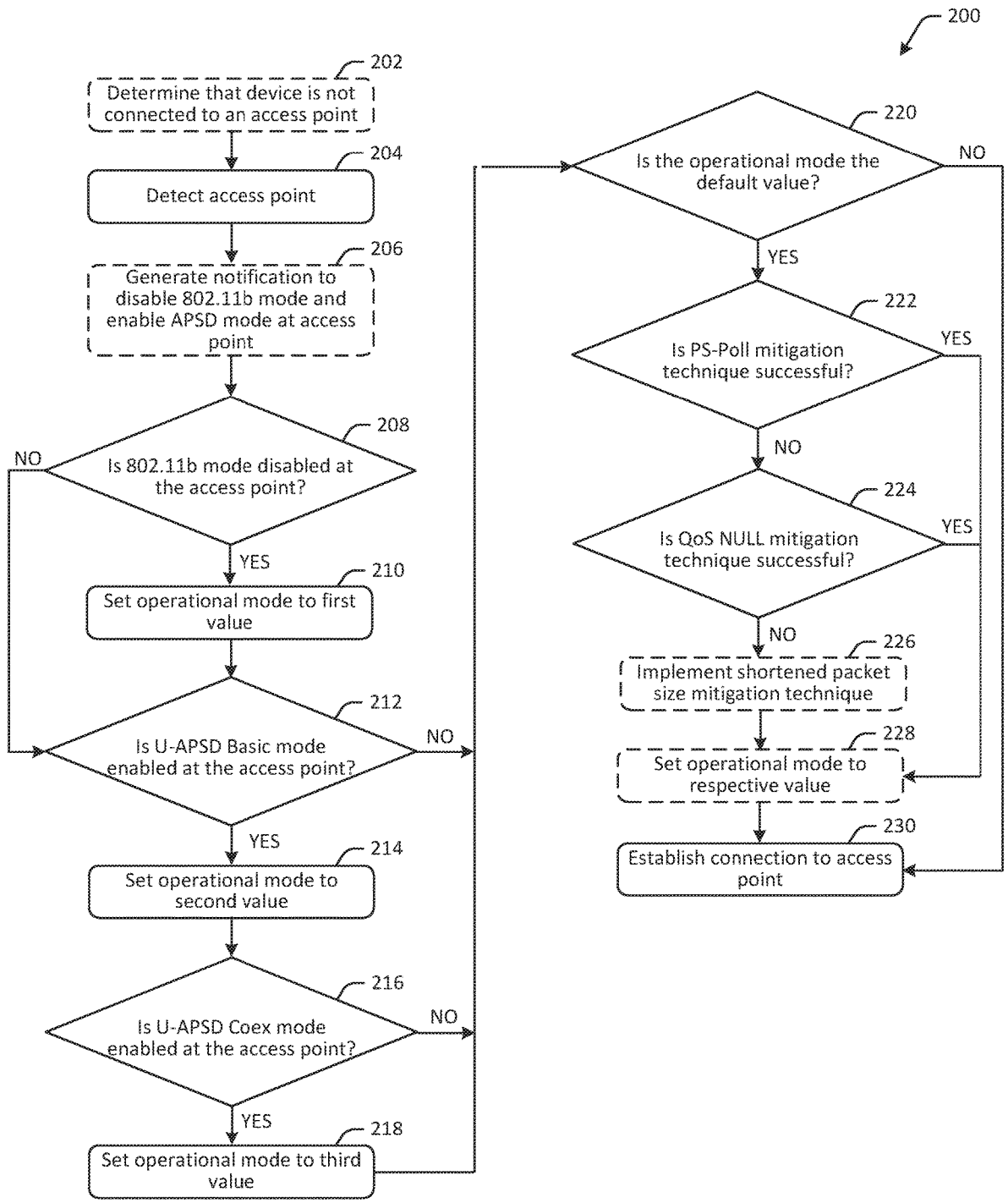
FIG. 2 is a schematic illustration of an example process flow for configuration of an electronic device to mitigate microwave interference in accordance with one or more example embodiments of the disclosure.

FIG. 2 depicts an example process flow 200 for configuration of an electronic device to mitigate microwave interference in accordance with one or more example embodiments of the disclosure. The process flow 200 of FIG. 2 may be used, for example, during setup and/or installation of a device, and/or when a device is moved to a new environment or coupled to a new access point.

While example embodiments of the disclosure may be described in the context of microwave oven devices and/or devices with certain voice-based functionality, it should be appreciated that the disclosure is more broadly applicable to any type of electronic device that may cause or be in the presence of radio interference. Some or all of the blocks of the process flows in this disclosure may be performed in a distributed manner across any number of devices. The operations of the process flow 200 may be optional and may be performed in a different order.

At optional block 202 of the process flow 200, computer-executable instructions stored on a memory of a device, such as a voice interaction device or a microwave device, may be executed to determine that the device is not connected to an access point. For example, a microwave oven device may determine that the device is not connected to an access point. This may indicate that the device is being setup or installed, or has been moved to a new location, and that the process flow 200 is to be executed to configure operation of the device.

At block 204 of the process flow 200, computer-executable instructions stored on a memory of a device, such as a voice interaction device or a microwave device, may be executed to detect an access point. For example, a microwave oven device may determine one or more beacons or may scan a wireless environment to detect access points available for connection. The device may determine an access point to connect to. For example, a user may indicate which access point the device is to connect to using an input device, which may be a user device, the voice interaction device, the microwave oven device, or another device.

At optional block 206 of the process flow 200, computer-executable instructions stored on a memory of a device, such as a voice interaction device or a microwave device, may be executed to generate a notification to disable an 802.11b mode and/or to enable an APSD or uAPSD mode at the access point. For example, a microwave oven device may generate an audio or visual notification requesting that a user change a configuration of the access point to disable an 802.11b or other direct-sequence spread spectrum mode at the access point, and/or requesting that the user enable an APSD or uAPSD mode at the access point. In some instances, the device may be unable to modify a configuration of the access point, and may therefore request that a user modify that configuration to disable a direct-sequence spread spectrum mode and/or enable an APSD or uAPSD mode at the access point. In other instances, the device may be able to automatically modify the configuration of the access point. In one example, the device may generate a user notification requesting that a direct-sequence spread spectrum mode be manually disabled at the access point.

Some access points may already have the direct-sequence spread spectrum mode disabled and/or the APSD/uAPSD mode enabled, in which case the optional block 206 may not be performed. For example, the access point may indicate that a uAPSD mode is enabled by setting a uAPSD bit of a field, such as a quality of service (QOS) information field, to a certain value in, for example, a WMM Information Element or WMM Parameter Element in beacons emitted by the access point, and/or in probe/re-association responses transmitted by the access point. Based at least in part on the data received in, for example, a beacon from the access point, the device may determine that the uAPSD mode is enabled at the access point. If the QoS information field is not set, the device may determine that the uAPSD mode is not enabled. Similarly, beacons from access points may be used by the device to determine whether an APSD mode is enabled or supported by the access point. A user may configure the access point accordingly based on, for example, the notification.

At determination block 208, a determination may be made as to whether a direct-sequence spread spectrum mode, such as 802.11b, is disabled at the access point. For example, a voice interaction device or a microwave device may test whether the access point accepts a request to establish a connection using an 802.11b or other direct-sequence spread spectrum protocol. If the access point accepts the request and/or establishes the connection, the determination at determination block 208 may be negative, whereas if the connection attempt is unsuccessful, the determination at determination block 208 may be positive. If it is determined at determination block 208 that the 802.11b mode is disabled at the access point, the process flow 200 may proceed to block 210, at which the device may set an operational mode to a first value. The first value may be indicative of the 802.11b mode being disabled at the access point. The operational mode may be used by the device to determine a mitigation technique to implement during microwave operation. If it is determined at determination block 208 that the 802.11b mode is not disabled at the access point, the process flow 200 may proceed to determination block 212.

At determination block 212, a determination may be made as to whether a uAPSD basic mode is enabled at the access point. For example, a voice interaction device or a microwave device may determine whether the access point has a uAPSD basic mode enabled. The determination may be made using, for example, beacons or probe/association responses from the access point. In one example, if the APSD field (e.g., bit number 11, etc.) of the beacon is set to 1, the uAPSD mode may be enabled at the access point. In another example, to test whether the uAPSD basic mode is enabled at the access point, the device may send an add traffic stream request to the access point with a maximum service period length field value set to 0, and an APSD field in a traffic specification information element set to 1. If the add traffic stream request is successful (e.g., an approval response is received from the access point indicating that the add traffic stream request is approved, etc.), the uAPSD basic mode may be determined to be enabled. A delete traffic stream request may then be sent to the access point to delete the traffic stream that was added. If it is determined at determination block 212 that the uAPSD basic mode is not enabled at the access point, the process flow 200 may proceed to determination block 220. If it is determined at determination block 212 that the uAPSD basic mode is enabled at the access point, the process flow 200 may proceed to block 214, at which the operational mode may be set to a second value, which may be different than the first value. The process flow 200 may proceed to determination block 216.

At determination block 216, a determination may be made as to whether a uAPSD coexistence mode is enabled at the access point. For example, a voice interaction device or a microwave device may determine whether the access point has a uAPSD coexistence mode enabled. The determination may be made using, for example, beacons or probe/association responses from the access point. In one example, if the APSD coexistence field (e.g., bit number 7, etc.) of QoS information field of the beacon is set to 1, the uAPSD coexistence mode may be enabled at the access point. In another example, to test whether the uAPSD coexistence mode is enabled at the access point, the device may send an add traffic stream request to the access point with a maximum service interval value set to 7000 (which may indicate a duration of 7000 microseconds, or 7 milliseconds), and an APSD field in a traffic specification information element set to 1. If the add traffic stream request is successful (e.g., an approval response is received from the access point indicating that the add traffic stream request is approved, etc.), the uAPSD coexistence mode may be determined to be enabled. A delete traffic stream request may then be sent to the access point to delete the traffic stream that was added. If it is determined at determination block 216 that the uAPSD coexistence mode is not enabled at the access point, the process flow 200 may proceed to determination block 220. If it is determined at determination block 216 that the uAPSD coexistence mode is enabled at the access point, the process flow 200 may proceed to block 218, at which the operational mode may be set to a third value, which may be different than the first value and/or the second value.

At determination block 220, a determination may be made as to whether the operational mode of the device is a default value. For example, a voice interaction device or a microwave device may determine whether the operational mode of the device is a default value is the default value, or is a different value, such as the first value, the second value, the third value, etc. If it is determined at determination block 220 that the operational mode is not the default value, the process flow 200 may proceed to block 230, at which a connection to the access point may be established. This may be because if the operational mode is not the default value, one of the mitigation techniques that were tested (corresponding to the respective operational modes) is valid and can be implemented, and setup or installation may be complete.

If it is determined at determination block 220 that the operational mode is the default value, the process flow 200 may proceed to determination block 222, at which a determination may be made as to whether a PS-poll mitigation technique is successful. The PS-poll mitigation technique may include sending an uplink packet with a power management field set to 1, indicating that the device is entering a power save mode. When the device is awake again, the device may send PS-poll frames or packets to the access point to fetch buffered data. The access point may send one buffered frame responsive to each PS-poll frame. The PS-poll mitigation technique is discussed with respect to FIG. 6. If the access point can support the PS-poll mitigation technique (e.g., over a short duration of 5-8 milliseconds, etc.) without disconnecting or dropping a connection to the device, the determination at determination block 222 may be positive. If the access point cannot support the PS-poll mitigation technique without dropping the connection to the device, the determination at determination block 222 may be negative. If it is determined at determination block 222 that the PS-poll mitigation technique is not successful, the process flow 200 may proceed to determination block 224.

If it is determined at determination block 222 that the PS-poll mitigation technique is successful, the process flow 200 may proceed to optional block 228, at which the operational mode may be set to the respective value that corresponds to the PS-poll mitigation technique, and then to block 230 at which a connection to the access point may be established.

At determination block 224, a determination may be made as to whether a QoS null mitigation technique is successful. The QoS null mitigation technique may include sending a first QoS null frame to the access point with a power management field set to 0, indicating that the device is in an awake mode at the start of the microwave inactive period, and sending a second QoS null frame to the access point with a power management field set to 1, indicating that the device is entering a power save mode at the end of the microwave inactive period, where the access point sends buffered data to the device between the first QoS null frame and the second QoS null frame. The QoS null mitigation technique is discussed with respect to FIG. 7. If the access point can support the QoS null mitigation technique (e.g., over a short duration of 5-8 milliseconds, etc.) without disconnecting or leaking packets to the device, the determination at determination block 224 may be positive. If the access point cannot support the QoS null mitigation technique, the determination at determination block 224 may be negative. If it is determined at determination block 224 that the QoS null mitigation technique is not successful, the process flow 200 may proceed to optional block 226.

If it is determined at determination block 224 that the QoS null mitigation technique is successful, the process flow 200 may proceed to optional block 228, at which the operational mode may be set to the respective value that corresponds to the QoS null mitigation technique, and then to block 230 at which a connection to the access point may be established.

At optional block 226, a shortened packet size mitigation technique may be implemented. The shortened packet size mitigation technique may include indicating a maximum packet size of, for example, 512 bytes during establishment of a TCP connection with the access point. The shortened packet size mitigation technique may be determined to be successful if data transmission is successful over a short duration of 5-8 milliseconds, etc. without disconnecting from the device. The process flow 200 may proceed to optional block 228, at which the operational mode may be set to the respective value that corresponds to the shortened packet size mitigation technique, and then to block 230 at which a connection to the access point may be established.

The order of mitigation techniques tested and/or implemented in FIG. 2 is an example and may be used to determine optimal performance for certain devices and/or access points. However, other embodiments may have different sequences and/or combinations of mitigation techniques that can be implemented. For example, some embodiments may implement both a uAPSD coexistence mode and shortened packet size mitigation techniques for improved results.

After setup or installation is complete, mitigation techniques may be implemented accordingly, until either the device is connected to a different access point, a significant change in environment occurs (e.g., signal strength decrease, etc.), or another event occurs.

For example, in instances where power save mode techniques are used, such as uAPSD basic, uAPSD coexistence, etc., the device may monitor physical layer rates to ensure proper operation of the mitigation technique. If the device determines that a physical layer rate is less than a threshold rate, so as to prevent effective implementation of the mitigation technique, the device may additionally implement the shortened packet size mitigation technique. For example, the device may transmit a request to establish a connection or re-associate with the access point, and the request may define a maximum segment size of 512 bytes. The device may receive an acknowledgment message from the access point indicating that the connection is established.

Figure 3:
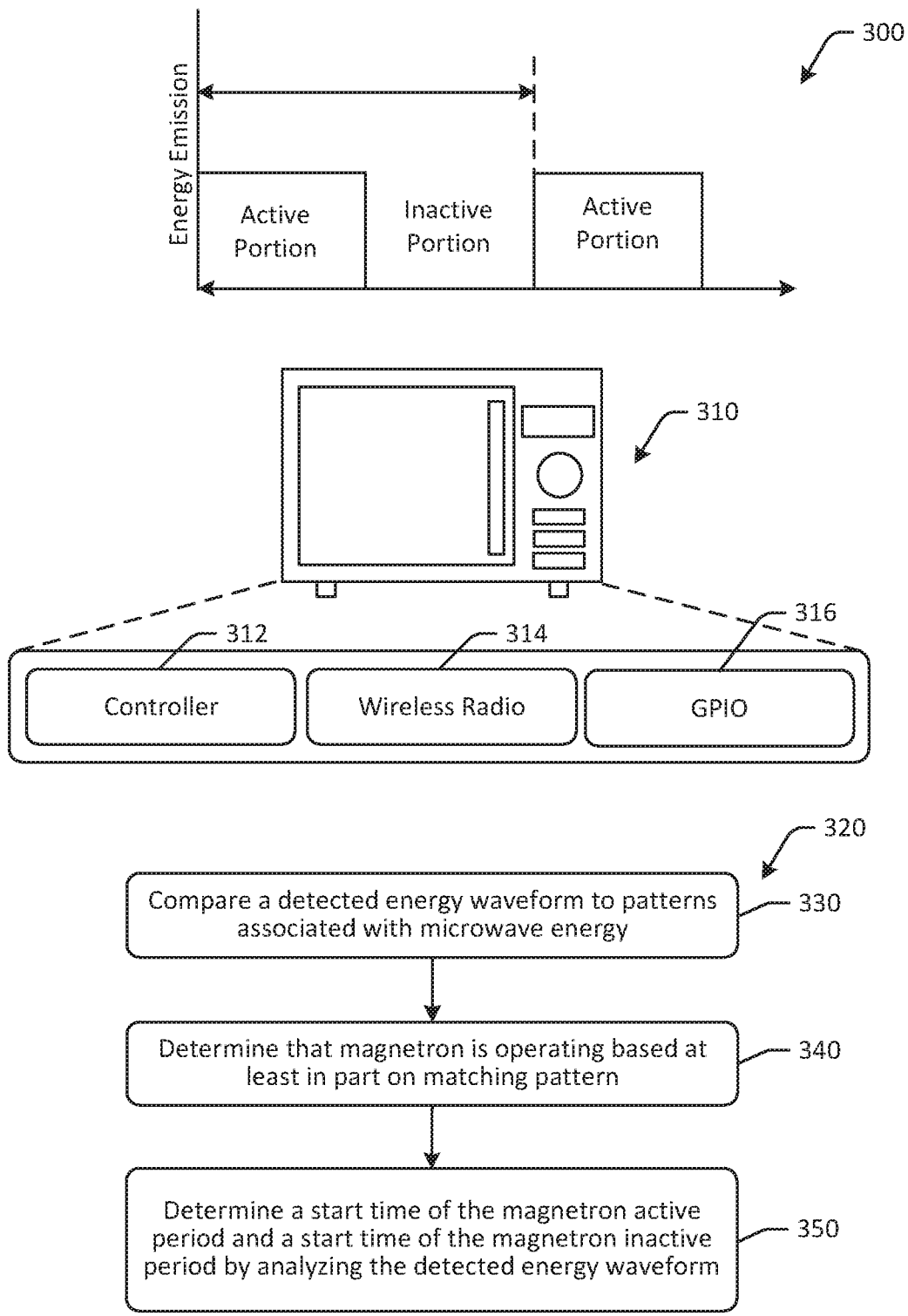
FIG. 3 is a schematic illustration of an example hybrid architecture and process flow for determining presence of microwave interference in accordance with one or more example embodiments of the disclosure.

FIG. 3 is a schematic illustration of an example hybrid architecture and process flow for determining presence of microwave interference in accordance with one or more example embodiments of the disclosure. Before microwave interference mitigation techniques are implemented, a determination may be made as to whether there is microwave interference present. FIG. 3 describes two example methods of determining whether microwave interference is present, including using general purpose input and output of a microwave and using pattern matching algorithms.

In FIG. 3, an example duty cycle 300 of a microwave oven 310 is illustrated. The duty cycle may be specific to a magnetron of the microwave oven 310 and may be an on-and-off or active-and-inactive cycle where the magnetron is actively emitting microwave energy during an "active period" of the cycle, and the magnetron is not emitting microwave energy during an "inactive period" of the cycle. The magnetron's on-and-off cycle time may be dictated by the input power frequency of the microwave oven, which can vary among different makes and models of microwaves. A common type of microwave oven operates at an input (alternating current) power frequency of 60 Hz, which means that the on-and-off cycle time of the magnetron is roughly 16 ms in duration. At a 50% duty cycle, this means that the duration of each one period of the magnetron's on-and-off cycle is roughly 8 ms, and the duration of each off period is also roughly 8 ms. By contrast, for a microwave oven with an input power frequency of 50 Hz, the on-and-off cycle time of the magnetron is 20 ms in duration. At a 50% duty cycle, this means that the duration of the magnetron's on period is 10 ms in duration. In some instances, the active portion and inactive portion may have different durations, while in other instances the active portion and the inactive portion may have the same duration.

The microwave oven 310 may include a controller 312, a wireless radio 314, and general purpose input output (GPIO) 316. In one embodiment, the controller 312 may include logic to determine whether the magnetron is operating using the GPIO 316, and, if so, implement a coordination mechanism to (i) prevent data from being sent wirelessly during the on period of the on-and-off cycle of the magnetron, and (ii) allow the data to be sent wirelessly during the off period of the on-and-off cycle of the magnetron. In other words, the microwave oven 310 (and/or other wireless communication devices in the environment) can wait (i.e., refrain from sending data wirelessly) during the on periods of the magnetron's on-and-off cycle, and send data (if available and necessary) during the off periods of the magnetron's on-and-off cycle. With this coordination mechanism in place, wireless data communication in the environment is not impacted by the microwave energy generated by the magnetron. Accordingly, the wireless communication devices in the environment 108 may remain operational in the presence of microwave energy.

Another example way of implementing the coordination mechanism is through a non-microwave wireless communication device's ability to detect non-WiFi energy using a wireless transceiver (e.g., a WiFi chip) and to adjust a Clear Channel Assessment (CCA) threshold in accordance with the on-and-off cycle of the magnetron. For example, a wireless transceiver (e.g., a WiFi chip) of the wireless communication device may be used to determine the presence of energy waveforms in the environment, and a pattern matching algorithm can be used to compare the detected energy waveform to a repository of microwave energy waveform patterns. If the detected energy waveform matches a pattern associated with microwave energy, this indicates to the non-microwave wireless communication device that a magnetron in the environment is operating. The detected energy waveform can be analyzed to determine a start time of the magnetron's on period, and a start time of the magnetron's off period, and the wireless communication device may use this timing information to dynamically adjust the CCA threshold in accordance with the on-and-off cycle of the magnetron, such as by increasing the CCA threshold at the start time of the magnetron's on period, and by decreasing the CCA threshold at the start time of the magnetron's off period. The wireless communication device may refrain from sending data wirelessly during the magnetron's on periods because the microwave energy generated by the magnetron is likely to exceed the relatively high CCA threshold during the magnetron's on period, yet the device may send data wirelessly during the magnetron's off periods when it is free from microwave interference. The lower CCA threshold during the magnetron's off period may also allow the wireless communication device to receive low RSSI signals.

Specifically, a wireless transceiver, such as a WiFi radio chip, may be configured to detect non-WiFi energy in the environment of the microwave oven 310, including microwave energy. This is a capability of many WiFi radio chips in existence today in the context of using an energy detect Clear Channel Assessment (CCA). A WiFi radio chip, for example, can be used to detect non-WiFi energy in the operating channel and may back off data transmission if the energy exceeds the CCA threshold. CCA thresholds are commonly set to levels of 20-30 decibel-milliwatts (dBm) above a minimum receive (Rx) sensitivity of the WiFi radio chip. This mechanism of the WiFi radio chip can be used to monitor the energy (radiation) on the operating channel of the microwave oven 310 or other device for purposes of detecting microwave energy that is indicative of the present operation of the microwave oven's magnetron.

Accordingly, the controller 312 of the microwave oven 310 or other device, such as the voice interaction device of FIG. 1, can use a wireless transceiver to determine an energy waveform that is present in the environment of the microwave oven 310, and then use a pattern matching algorithm to determine whether the detected energy waveform 504 matches a pattern associated with microwave energy. To do this, the controller 312 may compare the detected energy waveform to a repository (e.g., database) of microwave patterns stored in memory that is accessible to the device, such as a repository of microwave patterns stored in local memory of the device. If the detected energy waveform matches a pattern of multiple known microwave energy patterns, the device may take this as an indication that a magnetron in the environment is currently operating. For example, the magnetron of a nearby microwave oven may be operating and may be the source of the energy waveform detected using the wireless transceiver of the device.

Once the operation of the magnetron has been detected, the energy waveform can be analyzed to determine a start time of the magnetron's on period and a start time of the magnetron's off period of an on-and-off cycle (and/or for multiple on-and-off cycles). The on-and-off cycle of a given magnetron is deterministic, and based on this knowledge, the start times of each period of the magnetron's on-and-off cycle can be determined by extrapolating out from a portion of a detected energy waveform that has been determined to be a microwave energy waveform. With this timing information, the device can implement a coordination mechanism to mitigate microwave interference that involves a CCA threshold adjustment to dynamically adjust the CCA threshold of the wireless transceiver in accordance with the on-and-off cycle of the magnetron (as determined from the analysis of the energy waveform). For instance, interference can be mitigated by increasing the CCA threshold at the start time of the magnetron's on period from a first threshold value to a second threshold value that is greater than the first threshold value, and by decreasing the CCA threshold at the start time of the magnetron's off period from the second threshold value to the first threshold value. This may iterate to dynamically adjust the CCA threshold in order to coordinate the wireless traffic being sent from the device in the presence of microwave energy. The lower CCA threshold during the magnetron's off period allows the wireless communication device to receive low RSSI signals, while holding off data transmissions during the magnetron's on period.

An example method 320 is illustrated in FIG. 3. The method 320 may be used to determine a duty cycle for a microwave and/or a magnetron. At block 330, a wireless communication device, such as the voice interaction device of FIG. 1, the microwave oven 310, or a user device, may use a wireless transceiver of the wireless communication device to determine an energy waveform present in the environment of the wireless communication device. The device may compare the detected energy waveform to a repository of patterns that are representative of different microwave energy waveforms to see if the energy waveform matches any of the microwave energy patterns.

At block 340, the device may determine that a magnetron is operating based at least in part on determining that the energy waveform matches the pattern associated with the microwave energy. Any suitable pattern matching algorithm may be used for this purpose, and may use a similarity metric to determine if the energy waveform "matches" a microwave energy pattern. Matching, in this sense, may mean substantially matching by having a waveform that is within a threshold of a stored pattern in terms of both energy values and the period of the waveform.

At block 350, the device may determine a start time of the magnetron's on period and a start time of the magnetron's off period (over the course of an on-and-off cycle of the magnetron) based at least in part on the energy waveform detected. This analysis may look at the time periods over which microwave energy is present in the environment based on the energy waveform, and may extrapolate to determine start times of individual periods in an upcoming on-and-off cycle. This can be performed based on the notion that the magnetron's on-and-off cycle is deterministic in terms of the frequency and the duty cycle. Accordingly, start times of the magnetron's on and off periods can be predicted with reasonable accuracy.

In some embodiments, the CCA threshold of the wireless transceiver can be dynamically adjusted in accordance with the on-and-off cycle of the magnetron. The adjustment of the CCA threshold can include increasing the CCA threshold at the start time of the magnetron's on period from a first threshold value to a second threshold value that is greater than the first threshold value, and decreasing the CCA threshold at the start time of the following off period of the magnetron's cycle from the second threshold value back to the first threshold value.

Figure 4:
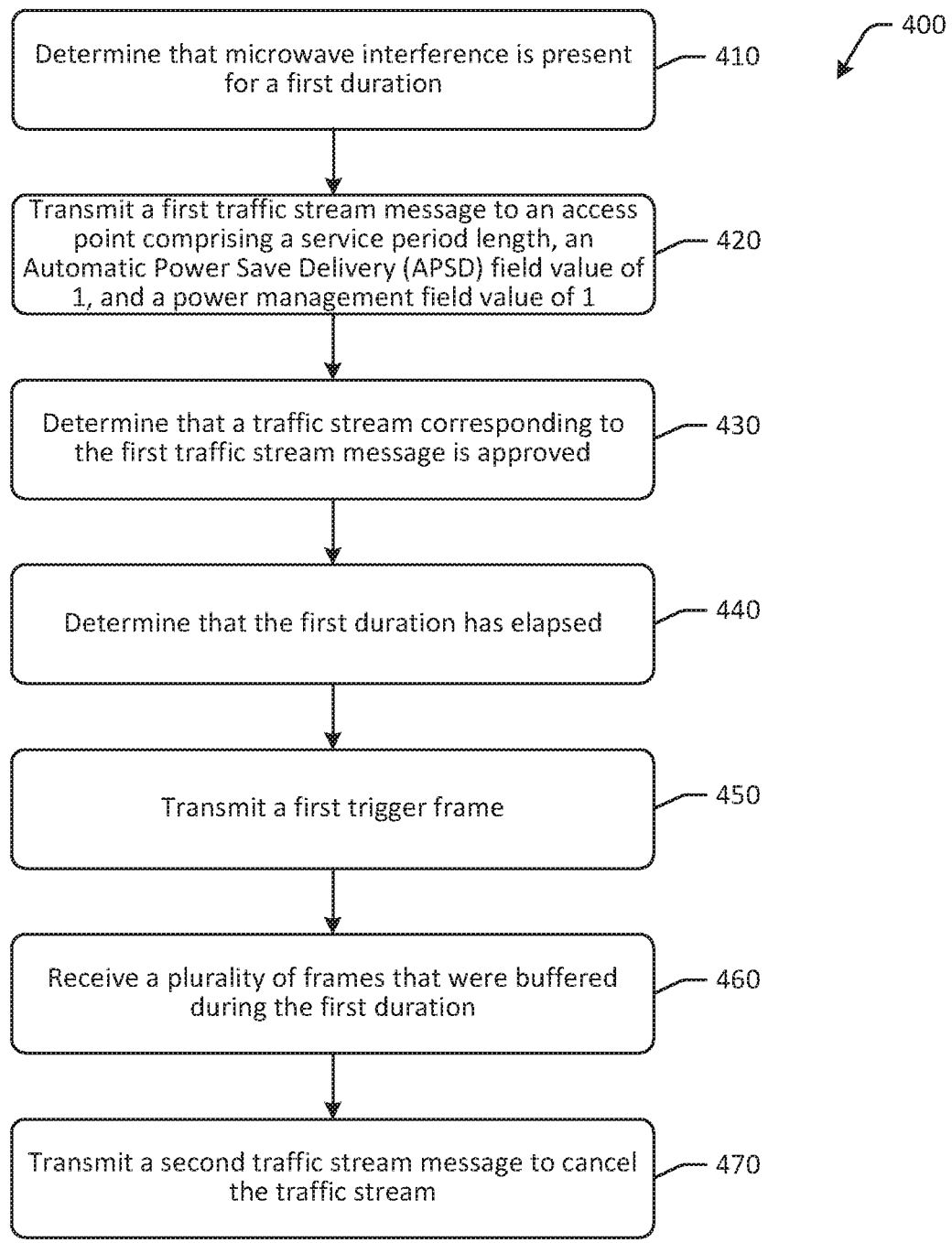
FIG. 4 is a schematic illustration of an example process flow for mitigating microwave interference in accordance with one or more example embodiments of the disclosure.

FIG. 4 is a schematic illustration of an example process flow 400 for mitigating microwave interference in accordance with one or more example embodiments of the disclosure. The process flow 400 of FIG. 4 may be used to implement a uAPSD coexistence mode mitigation technique, although certain operations of FIG. 4 may be applicable to other mitigation techniques as well.

While example embodiments of the disclosure may be described in the context of microwave oven devices and/or devices with certain voice-based functionality, it should be appreciated that the disclosure is more broadly applicable to any type of electronic device that may cause or be in the presence of radio interference. Some or all of the blocks of the process flows in this disclosure may be performed in a distributed manner across any number of devices. The operations of the process flow 400 may be optional and may be performed in a different order.

The uAPSD coexistence capability enables an access point to transmit frames during a period of the service period that improves the likelihood that the receiving device receives the frames when the receiving device is experiencing interference. The uAPSD coexistence capability reduces the likelihood that the access point transmits frames during the service period that are not received successfully. Receiving devices may use uAPSD to have some or all of their frames delivered during unscheduled service periods. Unscheduled service periods may begin when the access point receives a trigger frame from a device, which may be a QoS data or QoS Null frame associated with an access category that the device has configured to be trigger-enabled. An unscheduled service period ends after the access point has attempted to transmit at least one frame associated with a delivery enabled access category and destined for device, but no more than the number indicated in the maximum service period field if the field has a nonzero value. In order to configure an access point to deliver frames during an unscheduled service period, the device may designate one or more of its access categories to be delivery-enabled and one or more of its access categories to be trigger-enabled.

At block 410 of the process flow 400, computer-executable instructions stored on a memory of a device, such as a voice interaction device or a microwave device, may be executed to determine that microwave interference is present for a first duration, or that a microwave source is active for a first duration. For example, a microwave oven or voice interaction device may determine that microwave interference is present. In one instance, the device may determine that microwave interference is present based at least in part on data received from the microwave using general purpose input/outputs at the microwave. In another instance, the device may determine that microwave interference is present based at least in part on pattern matching.

At block 420 of the process flow 400, computer-executable instructions stored on a memory of a device, such as a voice interaction device or a microwave device, may be executed to transmit a first traffic stream message to an access point comprising a service period length, an Automatic Power Save Delivery (APSD) field value of 1, and a power management field value of 1. For example, a microwave oven or voice interaction device may transmit a QoS action frame that is an add traffic stream message to the access point. The add traffic stream message may indicate a service period length of a maximum duration of a service period, or a number of buffer units or frames that can be sent during a service period. For example, the device may transmit the first traffic stream message (or an association request) to the access point indicating a service period length of a first length of time (which may correspond to a uAPSD coexistence mitigation technique). In another example, the device may transmit an association request or a re-association request to the access point indicating a service period length of a first number of buffer units or frames (which may correspond to a uAPSD basic mitigation technique). In another example, the service period length may be set to 0, and device may be configured to transmit a null frame in order to receive buffered data (which may correspond to a QoS null mitigation technique).

At block 430 of the process flow 400, computer-executable instructions stored on a memory of a device, such as a voice interaction device or a microwave device, may be executed to determine that a traffic stream corresponding to the first traffic stream message is approved. For example, a microwave oven or voice interaction device may receive an approval message from the access point indicating that the traffic stream has been added or is approved.

At block 440 of the process flow 400, computer-executable instructions stored on a memory of a device, such as a voice interaction device or a microwave device, may be executed to determine that the first duration has elapsed, or that a microwave source is inactive. For example, a microwave oven or voice interaction device may determine that the first duration has elapsed. The first duration may correspond to the active portion of the magnetron of a microwave, and may be determined using the methods described in FIG. 3, for example.

At block 450 of the process flow 400, computer-executable instructions stored on a memory of a device, such as a voice interaction device or a microwave device, may be executed to transmit a first trigger frame. For example, a microwave oven or voice interaction device may transmit a first trigger frame. The first trigger frame may indicate that the access point is cleared to send buffered data to the device for a certain length of time, which may be defined in the first traffic stream message (e.g., add traffic stream message, etc.).

At block 460 of the process flow 400, computer-executable instructions stored on a memory of a device, such as a voice interaction device or a microwave device, may be executed to receive a plurality of frames that were buffered during the first duration. For example, a microwave oven or voice interaction device may receive a plurality of frames that were buffered during the first duration. The plurality of frames may be responsive to a single trigger frame. The plurality of frames may, in some instances, cause the device to implement an action based at least in part on a voice command (e.g., pausing or stopping a microwave, playing audio or video streaming content, etc.). In some instances, the plurality of frames may instead be command data or a command signal that causes the device to implement an action, such as increasing cook time, causing presentation of audio or visual content, and the like.

At block 470 of the process flow 400, computer-executable instructions stored on a memory of a device, such as a voice interaction device or a microwave device, may be executed to transmit a second traffic stream message to cancel the traffic stream. For example, a microwave oven or voice interaction device may transmit a second traffic stream message to cancel the traffic stream. Once the magnetron or other radio interference is completed, such as when the microwave is no longer in operation, the device may determine that the mitigation technique is no longer needed. The device may therefore send a second traffic stream message, which may be a QoS action frame, that is a delete traffic stream message. The access point may cancel the traffic stream after receiving the delete traffic stream message.

Figure 5:
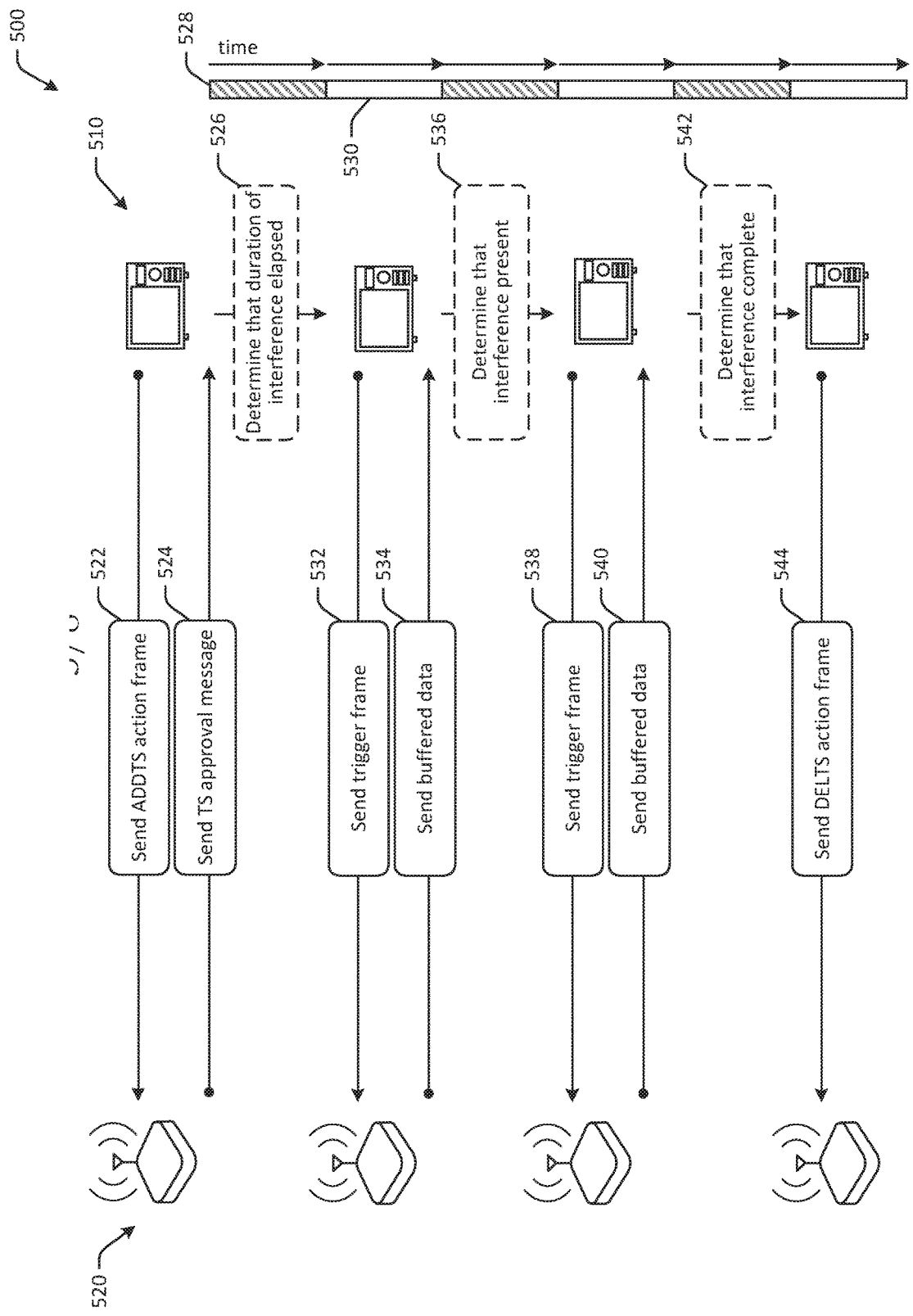
FIG. 5 is a schematic illustration of an example hybrid data and process flow for mitigating microwave interference in accordance with one or more example embodiments of the disclosure.

FIG. 5 is a schematic illustration of an example hybrid data and process flow 500 for mitigating microwave interference in accordance with one or more example embodiments of the disclosure. Different embodiments may include different, additional, or fewer operations than those illustrated in the example of FIG. 5. The data and process flow 500 may illustrate implementation of a uAPSD coexistence mitigation technique during times where microwave interference is present.

In FIG. 5, a device, such as a voice interaction device or a microwave oven 510 may be communicatively coupled to an access point 520. The microwave oven 510 may use one or more wireless radios to communicate with the access point 520. The microwave oven 510 and the access point 520 may be wirelessly connected over a WiFi network.

At a first operation 522 of the data and process flow 500, the microwave oven 510 may send an add traffic stream (ADDTS) action frame to the access point 520. The add traffic stream action frame may include an indication of a maximum service period, which may be a length of time, such as 7 milliseconds, or a number of buffered units, such as 3 or 6 buffer units. The maximum service period may be defined using time in instances where uAPSD coexistence mode is active, or may be defined using buffer units in instances where uAPSD basic mode is active.

The access point 520 may receive the action frame and, at a second operation 524, may send an approval notification to the microwave oven 510. The traffic stream may be initiated. At a third optional operation 526, the microwave oven 510 may determine that a duration of interference has elapsed.

For example, the active period of a magnetron of the microwave oven 510 may be complete. The active period of the magnetron duty cycle may have a first duration 528 and the inactive period of the magnetron duty cycle may have a second duration 530, which may be repeated until the microwave has completed a cook time. The microwave oven 510 may determine that the first duration 528 is complete at the third operation 526.

At a fourth operation 532, the microwave oven 510 may send a trigger frame to the access point 520. The trigger frame may be a null frame when the uAPSD basic mode is enabled. The trigger frame may be a QoS data or QoS null frame when the uAPSD coexistence mode is enabled. The access point 520 may receive the trigger frame and, at a fifth operation 534, may send buffered data to the microwave oven 510 for the second duration 530.

At an optional sixth operation 536, the microwave oven 510 may determine that interference is present during the active portion of the magnetron duty cycle, which may have the first duration 528.

After the first duration 528 elapses, at a seventh operation 538, the microwave oven 510 may send a trigger frame to the access point 520. The access point 520 may receive the trigger frame and, at an eighth operation 540, may send buffered data to the microwave oven 510 for the second duration 530.

At an optional ninth operation 542, the microwave oven 510 may determine at some point that interference is complete. For example, the microwave oven 510 may no longer be in operation.

At a tenth operation 544, the microwave oven 510 may send a delete traffic stream action frame to the access point 520, which may receive the frame and cancel the traffic stream. Normal wireless communication may resume. The process and data flow 500 may avoid delays caused by frequent power save mode switching and/or hardware buffer leaking, and may avoid low rate selection at the access point.

Figure 6:
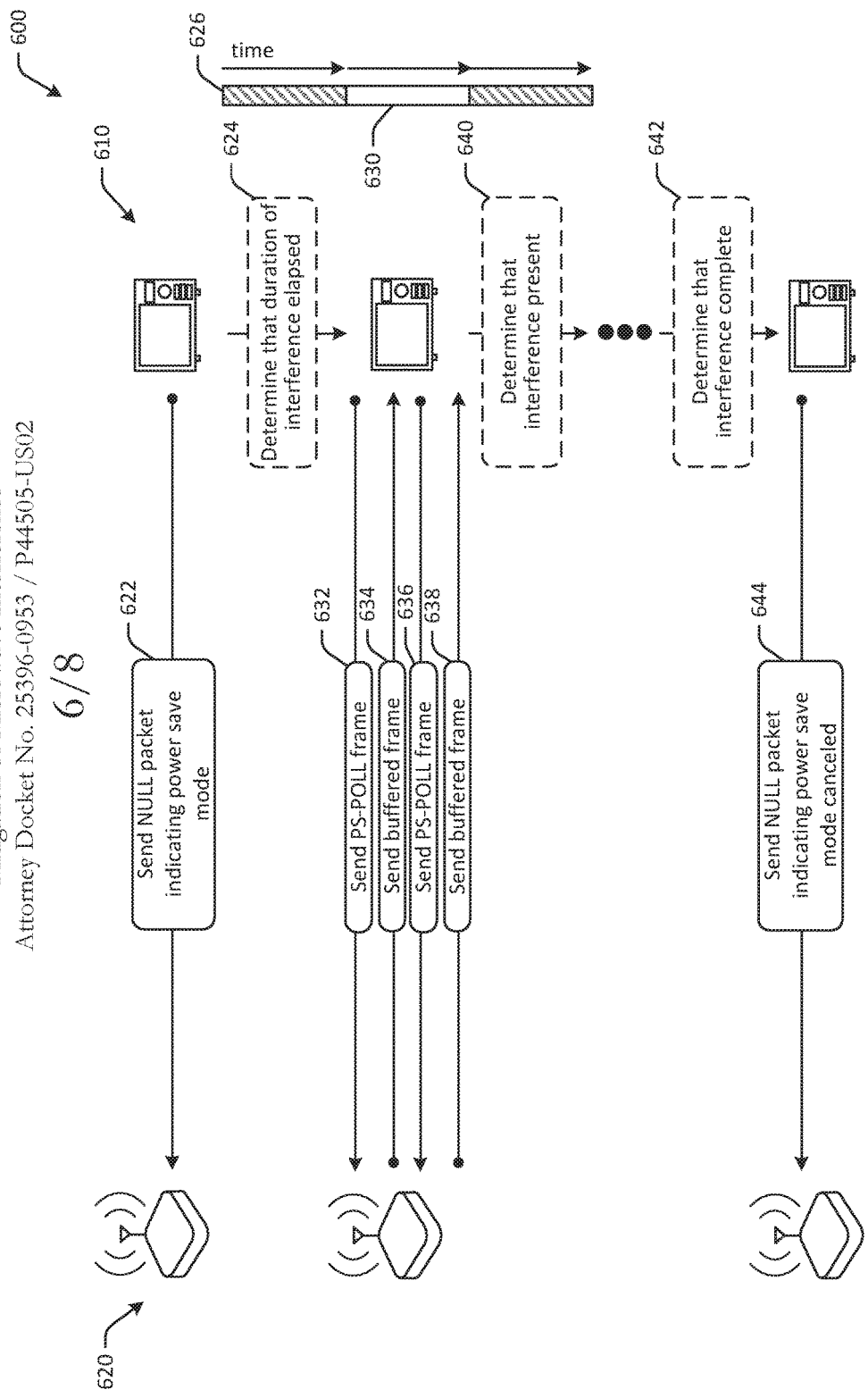
FIG. 6 is a schematic illustration of an example hybrid data and process flow for mitigating microwave interference in accordance with one or more example embodiments of the disclosure.

FIG. 6 is a schematic illustration of an example hybrid data and process flow 600 for mitigating microwave interference in accordance with one or more example embodiments of the disclosure. Different embodiments may include different, additional, or fewer operations than those illustrated in the example of FIG. 6. The data and process flow 600 may illustrate implementation of a PS-poll mitigation technique during times where microwave interference is present. In some embodiments, the PS-poll mitigation technique may be implemented in instances where a device determines that a uAPSD mode is unavailable (e.g., not supported, disabled, etc.) at an access point.

In FIG. 6, a device, such as a voice interaction device or a microwave oven 610 may be communicatively coupled to an access point 620. The microwave oven 610 may use one or more wireless radios to communicate with the access point 620. The microwave oven 610 and the access point 620 may be wirelessly connected over a WiFi network.

At a first operation 622 of the data and process flow 600, the microwave oven 610 may send a null frame to the access point 620. The null frame may indicate that the microwave oven 610 is entering a power save mode (e.g., power management field set as 1, etc.). In some instances, the microwave oven 610 may not actually enter the power save mode, while in other instances, the microwave oven 610 may enter the power save mode.

At an optional second operation 624, the microwave oven 610 may determine that a duration of interference has elapsed. For example, the active period of a magnetron of the microwave oven 610 may be complete. The active period of the magnetron duty cycle may have a first duration 626 and the inactive period of the magnetron duty cycle may have a second duration 630, which may be repeated until the microwave has completed a cook time. The microwave oven 610 may determine that the first duration 626 is complete at the optional second operation 624.

At a third operation 632, the microwave oven 610 may send a PS-poll frame to the access point 620. The PS-poll frame may be a first request for buffered data. The PS-poll frame may cause the access point 620 to send a buffered frame or packet to the microwave oven 610. The access point 620 may receive the PS-poll frame and, at a fourth operation 634, may send a buffered data packet to the microwave oven 610. In instances where there is more than one access category, multiple trigger frames or PS-poll frames may be sent to solicit more than one buffer unit.

After the first buffered frame is received, at a fifth operation 636, the microwave oven 610 may send another PS-poll frame to the access point 620. The PS-poll frame may cause the access point 620 to send another buffered packet to the microwave oven 610. The access point 620 may receive the PS-poll frame and, at a sixth operation 638, may send another buffered data packet to the microwave oven 610. This sequence may continue for the second duration 630, or while the magnetron is in the inactive period of the duty cycle.

At an optional seventh operation 640, the microwave oven 610 may determine that interference is present during the active portion of the magnetron duty cycle, which may have the first duration 626. At an optional eighth operation 642, the microwave oven 610 may determine that interference is complete. For example, the microwave oven 510 may no longer be in operation. At a ninth operation 644, the microwave oven 510 may send a null frame to the access point 620, indicating that the microwave oven 610 is no longer in a power save mode, or that the power save mode is inactive at the device. Normal wireless communication may resume.

Figure 7:
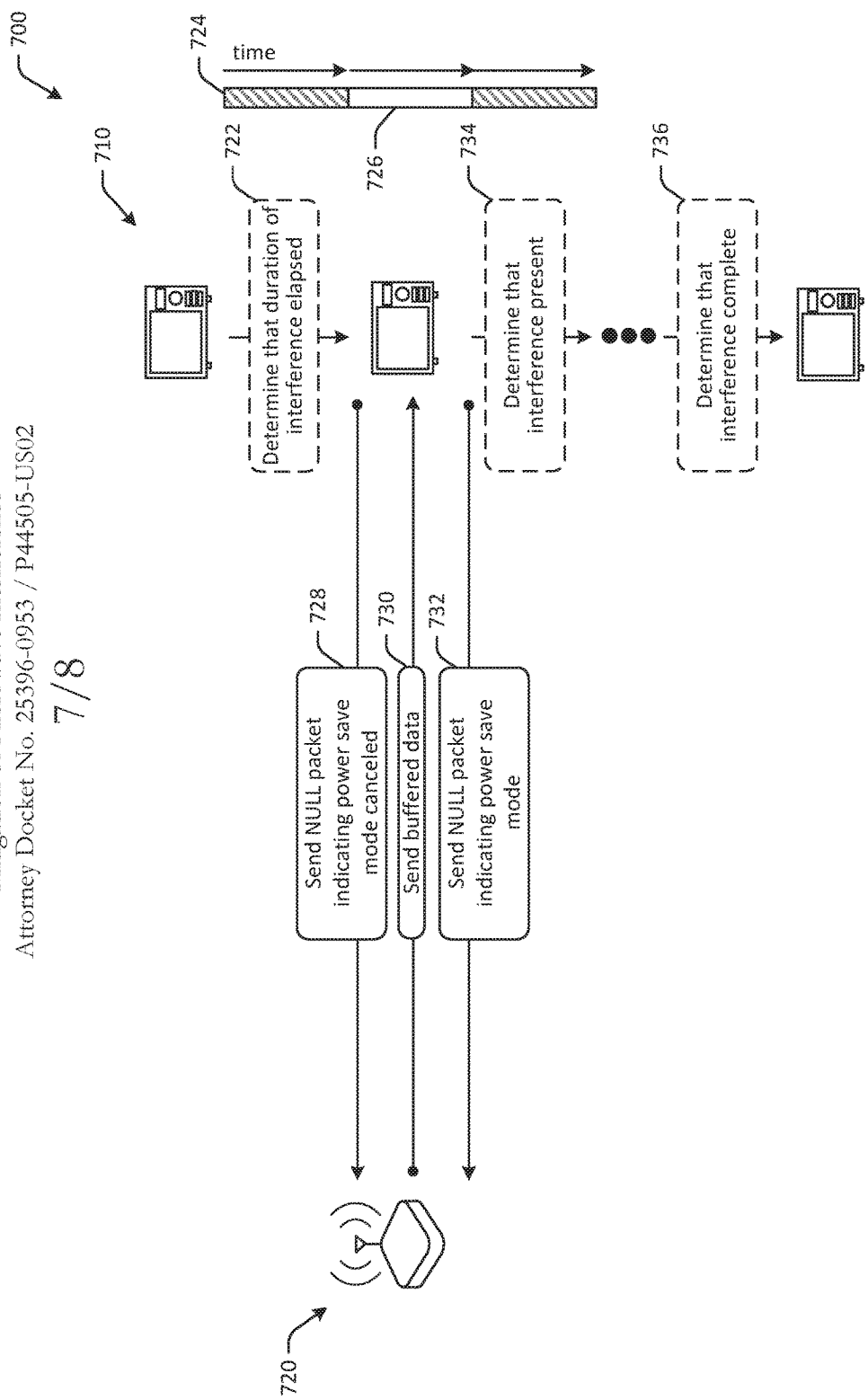
FIG. 7 is a schematic illustration of an example hybrid data and process flow for mitigating microwave interference in accordance with one or more example embodiments of the disclosure.

FIG. 7 is a schematic illustration of an example hybrid data and process flow 700 for mitigating microwave interference in accordance with one or more example embodiments of the disclosure. Different embodiments may include different, additional, or fewer operations than those illustrated in the example of FIG. 7. The data and process flow 700 may illustrate implementation of a QoS null mitigation technique during times where microwave interference is present. In some embodiments, the QoS null mitigation technique may be implemented in instances where a device determines that a uAPSD mode is unavailable (e.g., not supported, disabled, etc.) at an access point.

In FIG. 7, a device, such as a voice interaction device or a microwave oven 710 may be communicatively coupled to an access point 720. The microwave oven 710 may use one or more wireless radios to communicate with the access point 720. The microwave oven 710 and the access point 720 may be wirelessly connected over a WiFi network.

At an optional first operation 722, the microwave oven 710 may determine that a duration of interference has elapsed (e.g., no presence of microwave interference, etc.). For example, the active period of a magnetron of the microwave oven 710 may be complete. The active period of the magnetron duty cycle may have a first duration 724 and the inactive period of the magnetron duty cycle may have a second duration 726, which may be repeated until the microwave has completed a cook time. The microwave oven 710 may determine that the first duration 724 is complete at the optional first operation 722.

At a second operation 728 of the data and process flow 700, the microwave oven 710 may send a null frame to the access point 720. The null frame may indicate that the microwave oven 610 is not in a power save mode (e.g., power management field set as 0, etc.).

The access point 720 may receive the null frame and, at a third operation 730, may send buffered data to the microwave oven 710 per normal wireless communication protocol. In instances where there is more than one access category, multiple trigger frames or null frames may be sent to solicit more than one buffer unit. The microwave oven 710 may continue to receive data for the second duration 726. When the second duration 726 elapses, at a fourth operation 732, the microwave oven 710 may send a null frame to the access point 720. The null frame may indicate that the microwave oven 610 is entering a power save mode (e.g., power management field set as 1, etc.). The access point 720 may therefore stop sending data to the microwave oven 710 and may begin buffering data.

At an optional fifth operation 734, the microwave oven 710 may determine that interference is present during the active portion of the magnetron duty cycle, which may have the first duration 724. Eventually, at an optional sixth operation 736, the microwave oven 710 may determine that interference is complete. For example, the microwave oven 710 may no longer be in operation. Normal wireless communication may resume.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 8:
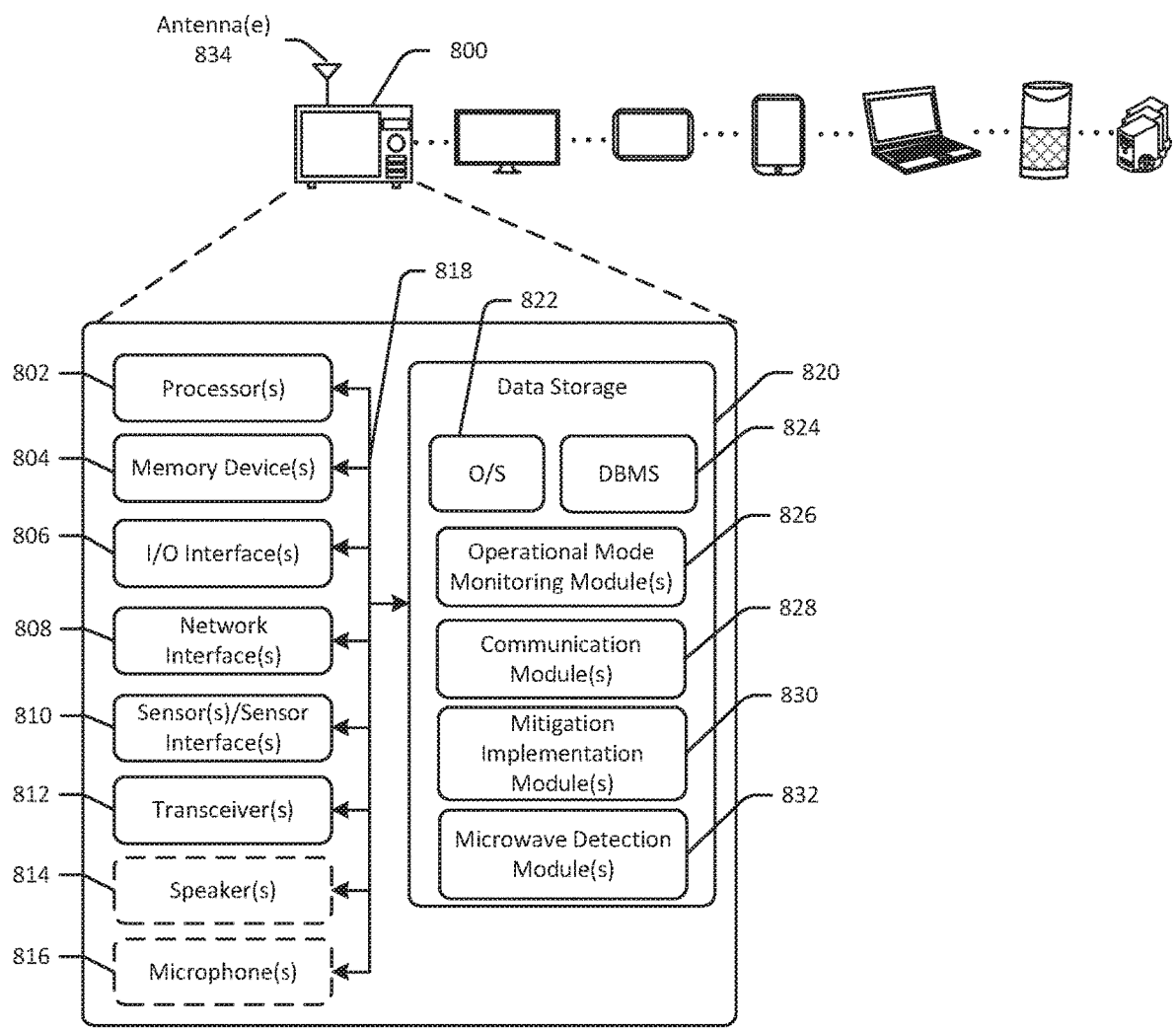
FIG. 8 is a schematic block diagram of an illustrative device in accordance with one or more example embodiments of the disclosure.

FIG. 8 is a schematic block diagram of an illustrative electronic device 800 in accordance with one or more example embodiments of the disclosure. The electronic device 800 may include any suitable appliance and/or computing device capable of receiving data and/or streaming content including, but not limited to, a content streaming device, a microwave, a television, a mobile device such as a smartphone, tablet, e-reader, wearable device, or the like; a desktop computer; a laptop computer; a content streaming device; a set-top box; or the like. The electronic device 800 may correspond to an illustrative device configuration for the devices of FIGS. 1-7.

The electronic device 800 may be configured to communicate via one or more networks with one or more servers, televisions or other displays, user devices, or the like. In some embodiments, a single content streaming device or single group of streaming device and/or servers may be configured to perform more than one type of thermal increase mitigation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC)

medium, a microwave medium, a radio frequency communication medium, a satellite communication medium, or any combination thereof.

In an illustrative configuration, the electronic device 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The electronic device 800 may further include one or more buses 818 that functionally couple various components of the electronic device 800. The electronic device 800 may further include one or more antenna (e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit an exchange of information (e.g., data (including computer-executable code), signaling, etc.) between various components of the electronic device 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the electronic device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more operational mode monitoring module(s) 826, one or more communication module(s) 828, one or more mitigation implementation module(s) 830, and/or one or more microwave detection module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the electronic device 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, historical thermal data, network connection data, performance changes due to mitigation techniques, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the electronic device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the operational mode monitoring module(s) 826 may include computer-executable instructions, code, or the like that responsive to execution by one or more of the processor(s) 802 may perform functions including, but not limited to, determining an active operational mode, determining operational mode priorities, determining whether operational modes are to be implemented at the same time, determining whether an operational mode is to be changed, provisioning a device, and so forth.

The communication module(s) 828 may include computer-executable instructions, code, or the like that responsive to execution by one or more of the processor(s) 802 may perform functions including, but not limited to, communicating with one or more devices, for example, via wired or wireless communication, communicating with remote servers, communicating with remote servers, streaming data, sending or receiving data such as audio data, notifications, alerts, etc., communicating with local area network devices, communicating with access points, and the like.

The mitigation implementation module(s) 830 may include computer-executable instructions, code, or the like that responsive to execution by one or more of the processor(s) 802 may perform functions including, but not limited to, determining mitigation techniques to implement, implementing mitigation techniques, causing the electronic device to implement certain actions, selecting appropriate mitigation techniques, and the like.

The microwave detection module(s) 832 may include computer-executable instructions, code, or the like that responsive to execution by one or more of the processor(s) 802 may perform functions including, but not limited to, communication with microwave oven devices, detecting magnetron cycle patterns, using general purpose input and output to determine magnetron cycles, storing data related to changes in throughput associated with various mitigation techniques, determining mitigation technique effectiveness, and the like.

Referring now to other illustrative components depicted as being stored in the data storage 820, the O/S 822 may be loaded from the data storage 820 into the memory 804 and may provide an interface between other application software executing on the electronic device 800 and hardware resources of the electronic device 800. More specifically, the O/S 822 may include a set of computer-executable instructions for managing hardware resources of the electronic device 800 and for providing common services to other application programs (e.g., managing memory allocation among various application programs). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device 800 is a mobile device, the DBMS 824 may be any suitable light-weight DBMS optimized for performance on a mobile device.

Referring now to other illustrative components of the electronic device 800, the input/output (I/O) interface(s) 806 may facilitate the receipt of input information by the electronic device 800 from one or more I/O devices as well as the output of information from the electronic device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna (e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The electronic device 800 may further include one or more network interface(s) 808 via which the electronic device 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna (e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna (e) 834 may be communicatively coupled to one or more transceivers 812 or radio components to which or from which signals may be transmitted or received.

As previously described, the antenna (e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 834 may be configured to transmit or receive radio frequency signals within any suitable frequency range forming part of the unlicensed portion of the radio spectrum.

The antenna (e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna (e) 834—transmitting or receiving radio frequency (RF) signals in the bandwidth and/or channels corresponding to the communications protocols utilized by the electronic device 800 to communicate with other devices. The transceiver(s) 812 may include hardware, software, and/or firmware for modulating, transmitting, or receiving-potentially in cooperation with any of antenna (e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the electronic device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionalities described as being supported by any of the program module(s) depicted in FIG. 8 may be implemented, at least partially, in hardware and/or firmware across any number of devices.

It should further be appreciated that the electronic device 800 may include alternate and/or additional hardware, software, or firmware components beyond those described or depicted without departing from the scope of the disclosure. More particularly, it should be appreciated that software, firmware, or hardware components depicted as forming part of the electronic device 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
a microwave source;
a radio frequency wireless radio;
memory that stores computer-executable instructions; and
at least one processor coupled to the microwave source, the radio frequency wireless radio, and the memory, and configured to execute the computer-executable instructions to:
transmit, using the radio frequency wireless radio, a first message to an access point coupled to the device, the first message requesting the access point to buffer data during a first duration during which the microwave source is active;
receive, from the access point, a second message responsive to the first message and indicating that an unscheduled automatic power save delivery (APSD) mode is enabled at the access point:
determine that the microwave source is inactive;
transmit, using the radio frequency wireless radio, a third message to the access point requesting the access point to send the data;
receive, from the access point, the data buffered during the first duration; and transmit, using the radio frequency wireless radio, a fourth message to the access point, the fourth message cancelling the buffer request of the first message.

2. The device of claim 1, wherein the at least one processor is configured to transmit the first message to the access point by accessing the memory and executing the computer-executable instructions to:
 transmit the first message to the access point, wherein the first message comprises a service period length that defines a length of time during which the access point is to send buffered data to the device, and wherein the service period length is equal to the first duration.

3. The device of claim 1, wherein the at least one processor is configured to transmit the first message to the access point by accessing the memory and executing the computer-executable instructions to:
 transmit an association request message to the access point, wherein the association request message comprises a number of buffer units that the access point is to send to the device upon receiving the second message, wherein the data buffered during the first duration corresponds to the number of buffer units.

4. The device of claim 1, wherein the second message is a null frame.

5. The device of claim 1, wherein the at least one processor is further configured to access the memory and execute the computer-executable instructions to:
 determine, after the first duration, that an unscheduled automatic power save delivery mode is unavailable at the access point;
 transmit a first null frame indicating that a power save mode is active at the device;
 determine that the microwave source is inactive;
 transmit a first request for a first frame buffered by the access point;
 receive the first buffered frame; and
 transmit a second null frame indicating that a power save mode is inactive at the device.

6. The device of claim 1, wherein the at least one processor is further configured to access the memory and execute the computer-executable instructions to:
 determine, after the first duration, that an unscheduled automatic power save delivery mode is unavailable at the access point;
 transmit a first null frame indicating that a power save mode is active at the device;
 determine that the microwave source is inactive;
 transmit a second null frame indicating that a power save mode is inactive at the device;
 receive first buffered data from the access point; and
 transmit a third null frame indicating that a power save mode is active at the device.

7. The device of claim 1, wherein the at least one processor is further configured to access the memory and execute the computer-executable instructions to:
 determine that a direct-sequence spread spectrum mode is disabled at the access point;
 determine that an operational mode of the device is a first value that corresponds to a first mitigation technique to be implemented at the device when a magnetron is active;
 determine that an unscheduled automatic power save delivery (APSD) mode is enabled at the access point;
 determine that the operational mode of the device is a second value that corresponds to a second mitigation technique to be implemented at the device when the magnetron is active;
 determine that an unscheduled APSD coexistence mode is enabled at the access point; and
 determine that the operational mode of the device is a third value that corresponds to a third mitigation technique to be implemented at the device when the magnetron is active.

8. The device of claim 1, wherein the at least one processor is further configured to access the memory and execute the computer-executable instructions to:
 receive voice input representing a voice command;
 determine that the microwave source is inactive;
 transmit voice data corresponding to the voice input to a voice processing server via the access point; and
 receive, via the access point, command data from the voice processing server, wherein the command data causes the device to implement an action.

9. The device of claim 1, wherein the first message comprises an automatic power save delivery (APSD) field value of 1 indicating a request to initiate the APSD mode for the device at the access point, and a power management field value of 1 indicating that the device is entering a sleep state.

10. The device of claim 1, wherein the at least one processor is further configured to access the memory and execute the computer-executable instructions to:
 determine a duty cycle of the microwave source, the duty cycle comprising an active portion and an inactive portion;
 determine the first duration of the active portion;
 determine a second duration of the inactive portion, wherein the data buffered during the first duration is received during the second duration.

11. A device comprising:
 a microphone;
 a microwave source;
 a WiFi radio;
 memory that stores computer-executable instructions; and
 at least one processor coupled to the microphone, the microwave source, the WiFi radio, and the memory and configured to execute the computer-executable instructions to:
  determine a voice command using the microphone;
  determine that the microwave source is active;
  determine an operational mode active at the device, the operational mode indicative of a mitigation technique selection;
  transmit, using the WiFi radio, a first message to an access point to buffer data to be sent to the device;
  receive, from the access point, a second message responsive to the first message and indicating that an unscheduled automatic power save delivery (APSD) mode is enabled at the access point:
  determine that the microwave source is inactive;
  transmit, using the WiFi radio, a first trigger frame; and
  receive a plurality of frames that were buffered by the access point.

12. The device of claim 11, wherein the at least one processor is configured to transmit the first message to the access point by accessing the memory and executing the computer-executable instructions to:
 transmit a first traffic stream message to the access point, wherein the first traffic stream message comprises a service period length that defines a length of time during which the access point is to send buffered data to the device, and wherein the service period length is equal to the first duration.

13. The device of claim 11, wherein the at least one processor is configured to transmit the first traffic stream message to the access point by accessing the memory and executing the computer-executable instructions to:

transmit an association request message to the access point, wherein the association request message comprises a number of buffer units that the access point is to send to the device upon receiving the second message, wherein the data buffered during the first duration corresponds to the number of buffer units.

14. The device of claim 11, wherein the at least one processor is further configured to access the memory and execute the computer-executable instructions to:

transmit a second message to the access point, the second message cancelling the buffer request of the first message.

* * * * *